US012270330B1

(12) United States Patent
Attard et al.

(10) Patent No.: US 12,270,330 B1
(45) Date of Patent: Apr. 8, 2025

(54) TURBOCHARGER INCORPORATING COLD LIGHT OFF CATALYST AND VALVE POSITIONING CONTROL

(71) Applicant: FCA US LLC, Auburn Hills, MI (US)

(72) Inventors: William Attard, Brighton, MI (US); Filip Vucak, Windsor (CA); Michael Barkey, Maidstone (CA); Jeongyong Choi, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,064

(22) Filed: Dec. 1, 2023

(51) Int. Cl.
*F02B 37/18* (2006.01)
*F01N 3/20* (2006.01)
*F01N 3/28* (2006.01)
*F02B 37/12* (2006.01)
*F02B 37/22* (2006.01)
*F02D 41/00* (2006.01)

(52) U.S. Cl.
CPC .......... *F02B 37/186* (2013.01); *F01N 3/2006* (2013.01); *F01N 3/2892* (2013.01); *F02B 37/12* (2013.01); *F02B 37/18* (2013.01); *F02B 37/183* (2013.01); *F02B 37/22* (2013.01); *F02D 41/0007* (2013.01)

(58) Field of Classification Search
CPC ........ F02B 37/12; F02B 37/18; F02B 37/183; F02B 37/186; F02B 37/22; F02D 41/0007; F02D 23/00; F01N 3/2006; F01N 3/2892
See application file for complete search history.

(56) References Cited

U.S. PATENT DOCUMENTS

| | | | |
|---|---|---|---|
| 2015/0000270 A1* | 1/2015 | Lombard | F02B 37/183 60/273 |
| 2017/0037786 A1* | 2/2017 | Fabien | F02D 9/02 |
| 2019/0162113 A1* | 5/2019 | Rao | F01D 5/043 |
| 2020/0095913 A1* | 3/2020 | Rohde | F01N 3/208 |

* cited by examiner

Primary Examiner — Loren C Edwards
(74) Attorney, Agent, or Firm — Jeremy J. Klobucar

(57) ABSTRACT

A control system for an engine comprising a turbocharger includes a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to command the CLOC valve to a first position whereby exhaust flow is routed to the CLOC in a CLOC mode; determine, based on operation in the CLOC mode, a pressure of the turbine of the turbocharger; compare the determined pressure to a pressure threshold; determine a target position of the CLOC valve to mitigate oil leakage from the turbocharger during CLOC operation; and command the CLOC valve to the target position.

12 Claims, 3 Drawing Sheets

TURBOCHARGER INCORPORATING COLD LIGHT OFF CATALYST AND VALVE POSITIONING CONTROL

FIELD

The present application generally relates to turbochargers and, more particularly, to techniques for controlling a valve that directs exhaust flow around the turbocharger and into a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350° C. depending on catalyst formulation. Typically at engine startup, idle exhaust temperatures are much below the high temperatures needed for optimal catalyst efficiencies. In particular, an amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to command the CLOC valve to a first position whereby exhaust flow is routed to the CLOC in a CLOC mode; determine, based on operation in the CLOC mode, a pressure of the turbine of the turbocharger; compare the determined pressure to a pressure threshold; determine a target position of the CLOC valve to mitigate oil leakage from the turbocharger during CLOC operation; and command the CLOC valve to the target position.

In some implementations, commanding the CLOC valve to the first position comprises commanding the CLOC valve to a position wherein all exhaust flow is directed to the CLOC.

In other implementations, the controller is configured to command the CLOC valve to an open position based on a determination that the determined pressure does not exceed the pressure threshold.

In additional implementations, the pressure threshold is indicative of a vacuum condition within the turbocharger. In examples, the open position comprises a position corresponding to 1% open. In other examples, the target position comprises a partially open position wherein a vacuum condition in the turbocharger is reduced and oil flow leakage from the turbocharger into the aftertreatment is reduced.

In implementations, determining the pressure of the turbine of the turbocharger comprises receiving a signal from a pressure sensor indicative of the pressure of the turbine.

In some implementations, determining the pressure of the turbine of the turbocharger comprises estimating the pressure of the turbine based on operating conditions.

According to another example aspect of the invention, a method for controlling an engine comprising a turbocharger includes commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode; determining, based on operation in the CLOC mode, a pressure of the turbine of the turbocharger; comparing the determined pressure to a pressure threshold; determining, based on the comparison, a target position of the CLOC valve to mitigate oil leakage from the turbocharger during CLOC operation; and commanding the CLOC valve to the target position.

In some implementations, commanding the CLOC valve to the first position includes commanding the CLOC valve to a position wherein all exhaust flow is directed to the CLOC.

In other implementations, commanding the CLOC valve to an open position based on a determination that the determined pressure does not exceed the pressure threshold.

In additional implementations, the pressure threshold is indicative of a vacuum condition within the turbocharger. The open position comprises a position corresponding to 1% open.

In additional implementations, the target position comprises a partially open position wherein a vacuum condition in the turbocharger is reduced and oil flow leakage from the turbocharger into the aftertreatment is reduced.

In additional implementations, determining the pressure of the turbine of the turbocharger comprises receiving a signal from a pressure sensor indicative of the pressure of the turbine.

In additional implementations, determining the pressure of the turbine of the turbocharger comprises estimating the pressure of the turbine based on operating conditions.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward emission control on turbocharged engines. A system and related techniques are described for controlling a cold start light off catalyst (CLOC) where a CLOC valve is controlled to divert exhaust gas from the turbine of the turbocharger and through a small catalyst in a CLOC mode. The CLOC can achieve high efficiency quickly to treat the exhaust gas, while a much larger downstream catalyst is warming up. During full rerouting of the exhaust from the turbocharger and to the CLOC, vacuum conditions can arise within the turbocharger body causing potential oil leaking between the turbine and turbocharger body. The techniques of the instant disclosure control the CLOC valve by moving it to a partially open position to relieve pressure in the turbocharger body and thereby mitigate oil leaking between the turbine and turbocharger body during operation in the CLOC mode.

Figure 1:
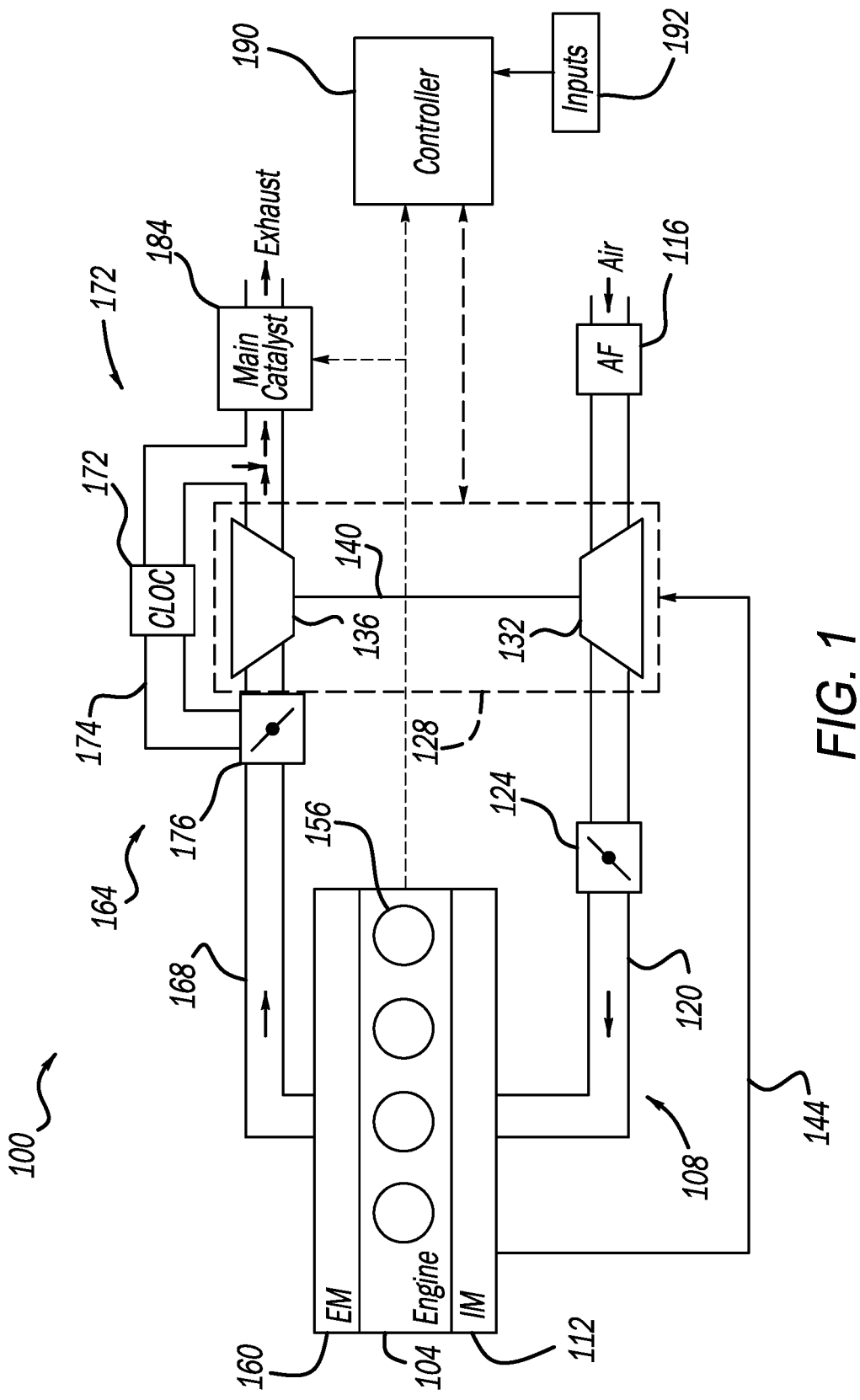
FIG. 1 is a diagram of an example vehicle comprising a turbocharged engine incorporating a cold light off catalyst (CLOC) and CLOC valve according to the principles of the present disclosure.

Referring now to FIG. 1, a diagram of an example vehicle 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174. Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172. As used herein a "CLOC mode" is used to refer to the controller 190 commanding the CLOC valve 176 to route at least some exhaust to the CLOC 172.

A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high efficiency quickly and treat the exhaust gas such as when the main catalyst 184 has yet to reach optimal operating temperature.

Lubrication oil from the engine 104 is routed through an oil line 144 to the turbocharger 128 to lubricate components of the turbocharger 128. In examples, the oil is sourced from the engine 104 at the sump.

A controller, also referred to herein as an engine controller, 190 controls operation of the vehicle 100. Examples of components controlled by the controller 190 include the engine 104, the throttle valve 124, and the CLOC valve 176. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 190 controls operation of these various components based on measured and/or modeled parameters.

Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
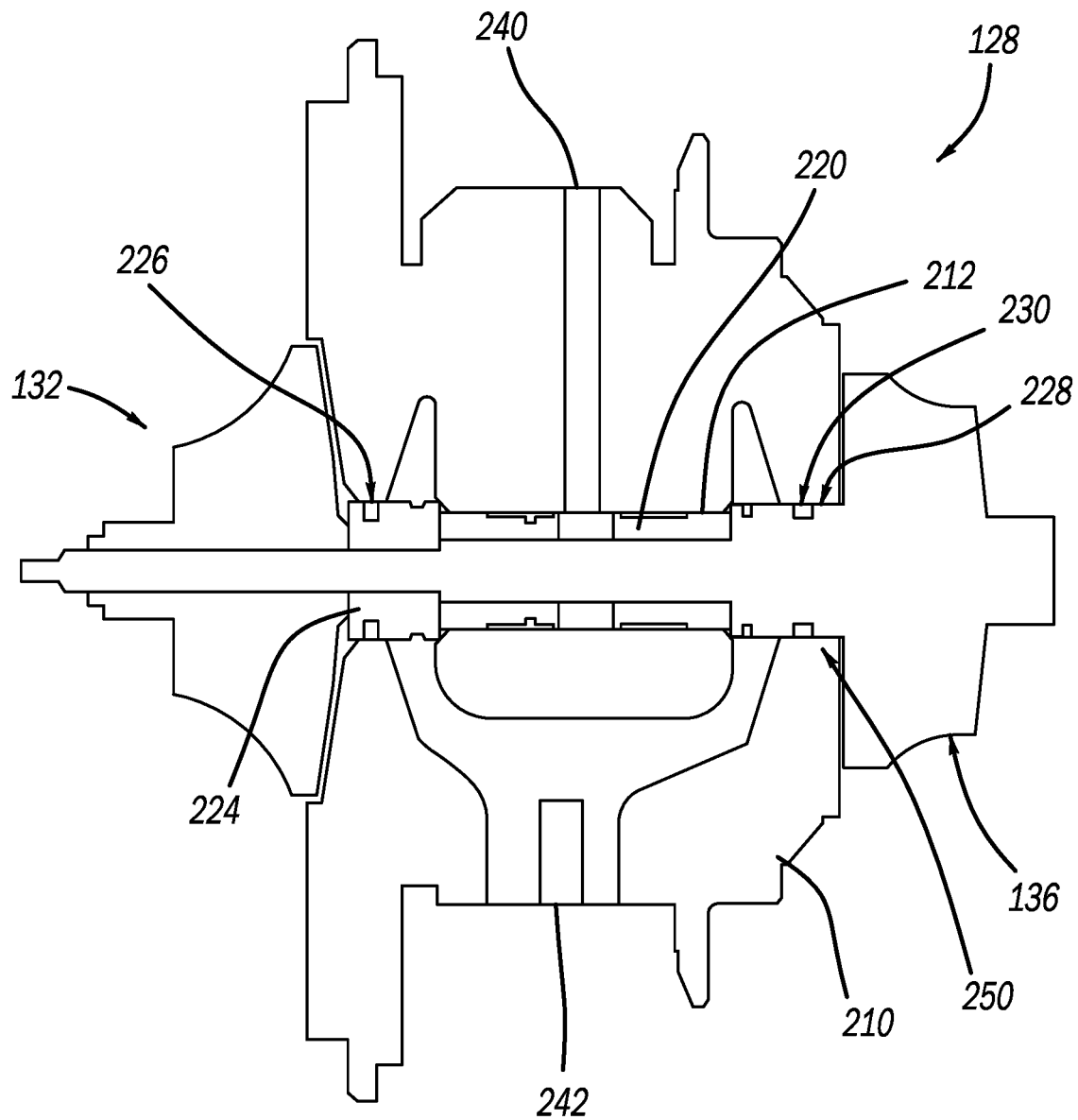
FIG. 2 is a sectional view of the turbocharger of FIG. 1 illustrating an exemplary oil feed and drain according to the principles of the present disclosure.

With additional reference now to FIG. 2, additional features of the turbocharger 128 will be described. The turbocharger 128 includes a turbocharger body or housing 210 that generally defines a central passage 212 that accommodates a central bearing 220 that receives the shaft 140. A compressor seal assembly 224 is arranged adjacent to the compressor 132. A compressor piston ring seal 226 secures the compressor seal assembly 224 relative to the turbocharger housing 210. A turbine seal assembly 228 is arranged adjacent to, or is integrally formed with, the turbine 136. A turbine piston ring seal 230 secures the turbine seal assembly 228 relative to the turbocharger housing 210.

The turbocharger body 210 further defines an oil supply or feed 240 and an oil drain 242. The locations and orientations of the oil feed 240 and oil drain 242 are merely exemplary as shown in FIG. 2 with the appreciation that oil is delivered to and away from the turbocharger 128 for the purposes of lubricating essential components (e.g., the center bearing 220 and the seal assemblies 224, 228). During operation of the CLOC 172, and specifically when the CLOC valve 176 is fully closed, a vacuum condition can be generated in the turbocharger housing 210.

The vacuum condition can result from zero exhaust flow spinning the turbine 136 (and therefore the compressor 132). Such vacuum condition can cause lubrication oil (oil pull-over) to be sucked past the turbine seal assembly 228 (and/or the compressor seal assembly 224) along the path generally identified at 250 and into the exhaust system 164 resulting in damage to the aftertreatment system. The techniques described herein mitigate this potential oil leakage condition during CLOC operation.

Figure 3:
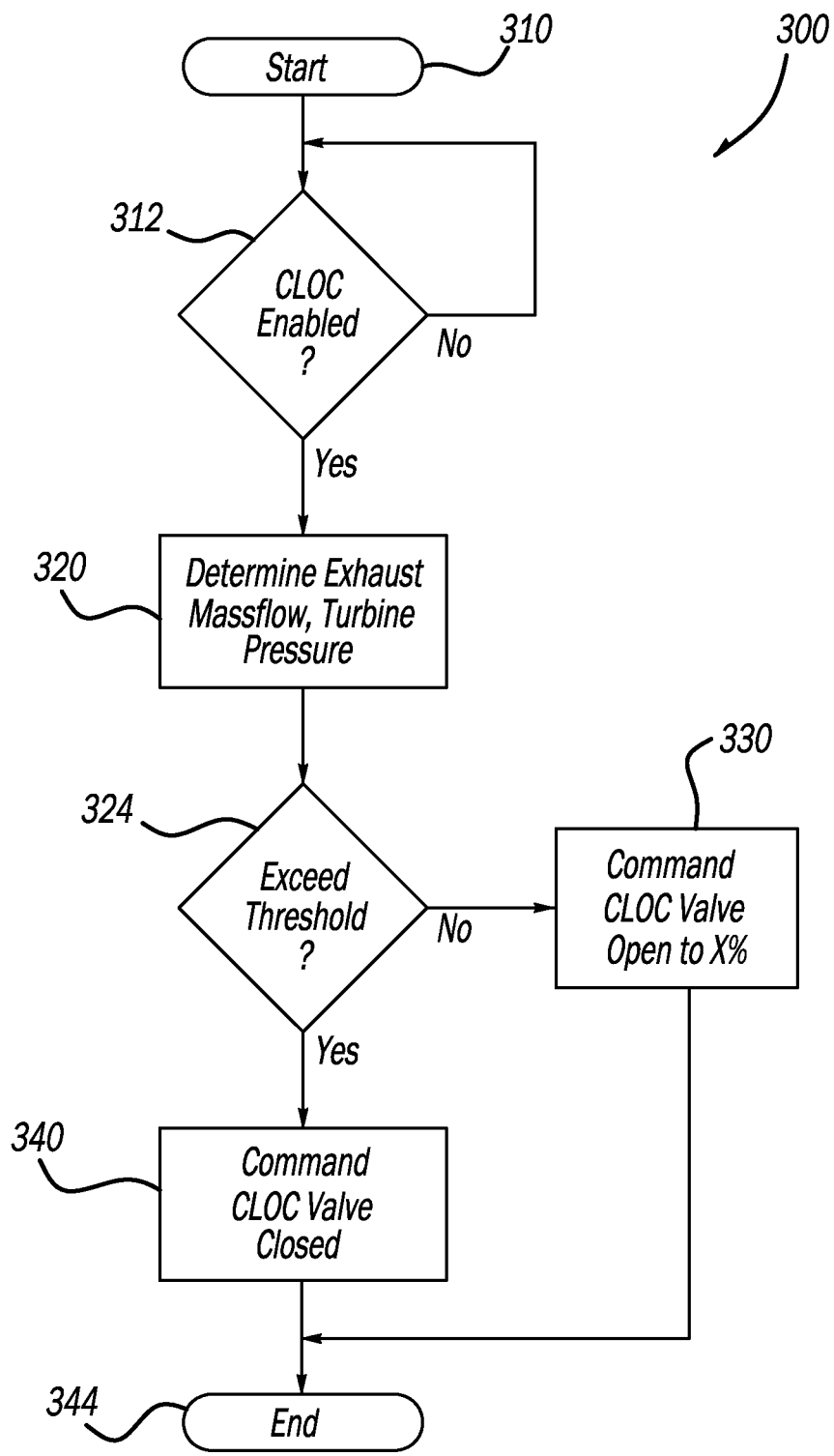
FIG. 3 is a flow diagram of an example method of operating the CLOC valve of the turbocharged engine according to the principles of the present disclosure.

Referring now to FIG. 3, a flow chart of an example method 300 of operating the engine 104 having the turbocharger 128, CLOC 172 and CLOC valve 176 is illustrated. For explanatory purposes, components of the vehicle 100 will be referenced, but it will be appreciated that this method 300 could be used for any engine having a turbocharger and CLOC. Control starts at 310. At 312, the controller 190 determines whether CLOC is enabled. Again, CLOC operation can be enabled such as at startup of the engine 104 when the main catalyst 184 has not reached optimal operating temperature. At 320 control determines a pressure of the turbine 132.

In examples, the controller 190 can receive a pressure measurement within the turbocharger 128 from the inputs 192, such as from a pressure sensor configured on the turbocharger 128. In other examples, the pressure can be estimated based on models and other operating conditions. At 324 control determines whether the pressure within the turbocharger 128 is less than a threshold. In examples, a threshold can be indicative of a vacuum condition in the housing 210. If the pressure does not exceed a threshold (indicative of a vacuum condition in the turbocharger housing 210), control commands the CLOC valve 176 to open to a target position a predetermined amount at 330 to relieve the vacuum condition (and return to near atmospheric pressure at the turbocharger housing 210). In examples, the predetermined amount can be 1%. The CLOC valve 176 can be moved to other degrees of open beyond 1% within the scope of this disclosure.

If the pressure exceeds the threshold (indicative of a vacuum condition not present in the turbocharger housing 210), control commands the CLOC valve closed at 340. Again, if no vacuum conditions exist within the turbocharger housing 210, the CLOC valve 176 can be moved to the fully closed position. In additional examples, an exhaust mass flow can be determined at 320 and control can determine whether a vacuum condition exists in the turbocharger housing 210 based additionally or alternatively on the exhaust mass flow. The exhaust mass flow can be a measured value from the inputs 192 or can be estimated based on models. In some examples, the controller 190 can determine a target position of the CLOC 176 to optimize exhaust treatment through the CLOC while minimizing potential for oil leakage (pullover) from the turbocharger during CLOC operation.

As identified above, models can estimate the exhaust flow and the turbine pressure to determine whether to regulate the CLOC valve 176. CLOC valve characterization can be used to determine the desired CLOC valve positioning to control the turbine inlet pressure to a desired target. The controller 190 can send a signal to the CLOC valve to move to an open position, a closed position or any position therebetween based on the measured or estimated pressure in the turbocharger 128. Control ends at 344.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
    a cold light off catalyst (CLOC) positioned in a bypass passage around a turbine of the turbocharger;
    a CLOC valve that selectively routes exhaust flow from the engine between the turbine and the CLOC; and
    a controller configured to:
        command the CLOC valve to a first position whereby exhaust flow is routed, at least partially, to the CLOC in a CLOC mode;
        determine, based on operation in the CLOC mode, a pressure of the turbine of the turbocharger;
        compare the determined pressure to a pressure threshold and determine a vacuum condition exists within the turbocharger when the determined pressure is less than the pressure threshold;
        determine, based on the comparison, a target position of the CLOC valve to mitigate oil leakage from the turbocharger during CLOC operation; and
        command the CLOC valve to the target position including commanding the CLOC valve to a minimally open position based on the determination that the vacuum condition exists within the turbocharger when the determined pressure is less than the pressure threshold.

2. The control system of claim 1, wherein commanding the CLOC valve to the first position comprises commanding the CLOC valve to a position wherein all exhaust flow is directed to the CLOC.

3. The control system of claim 1, wherein the minimally open position comprises a position corresponding to 1% open.

4. The control system of claim 1, wherein the target position comprises a partially open position wherein a vacuum condition in the turbocharger is reduced and oil flow leakage from the turbocharger is reduced.

5. The control system of claim 1, wherein determining the pressure of the turbine of the turbocharger comprises receiving a signal from a pressure sensor indicative of the pressure of the turbine.

6. The control system of claim 1, wherein determining the pressure of the turbine of the turbocharger comprises estimating the pressure of the turbine based on operating conditions.

7. A method for controlling an engine comprising a turbocharger, the method comprising:
    commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode;
    determining, based on operation in the CLOC mode, a pressure of the turbine of the turbocharger;
    comparing the determined pressure to a pressure threshold and determining a vacuum condition exists within the turbocharger when the determined pressure is less than the pressure threshold;
    determining, based on the comparison, a target position of the CLOC valve to mitigate oil leakage from the turbocharger during CLOC operation; and
    commanding the CLOC valve to the target position including commanding the CLOC valve to a minimally open position based on the determination that the vacuum condition exists within the turbocharger when the determined pressure is less than the pressure threshold.

8. The method of claim 7, wherein commanding the CLOC valve to the first position includes commanding the CLOC valve to a position wherein all exhaust flow is directed to the CLOC.

9. The method of claim 7, wherein the minimally open position comprises a position corresponding to 1% open.

10. The method of claim 7, wherein the target position comprises a partially open position wherein the vacuum condition in the turbocharger is reduced and oil leakage from the turbocharger is reduced.

11. The method of claim 7, wherein determining the pressure of the turbine of the turbocharger comprises receiving a signal from a pressure sensor indicative of the pressure of the turbine.

12. The method of claim 7, wherein determining the pressure of the turbine of the turbocharger comprises estimating the pressure of the turbine based on operating conditions.

* * * * *